United States Patent [19]
Skaggs et al.

[11] Patent Number: 6,125,945
[45] Date of Patent: Oct. 3, 2000

[54] THREE POINT HITCH WITH ON BOARD STORAGE RECEPTACLES

[76] Inventors: Roger B. Skaggs, HC 75 Box 770;
John P. Skaggs, HC 75 Box 750, both of Sandy Hook, Ky. 41171

[21] Appl. No.: 09/198,324

[22] Filed: Nov. 24, 1998

[51] Int. Cl.[7] ................................................ A01B 59/06
[52] U.S. Cl. ........................................ 172/439; 280/491.5
[58] Field of Search .............................. 172/439, 47, 248,
172/413, 443, 677, 240, 272, 249; 280/416.2,
416.1, 417.1, 511, 491.5, 491.1; 414/24.5;
294/126

[56] References Cited

U.S. PATENT DOCUMENTS

| | | | |
|---|---|---|---|
| 2,685,468 | 3/1954 | Blocker et al. | 287/103 |
| 2,780,160 | 2/1957 | Harris | 97/46.59 |
| 2,838,327 | 6/1958 | Collins | 280/491 |
| 3,716,253 | 2/1973 | Gniffke et al. | 172/248 |
| 3,795,415 | 3/1974 | Koch et al. . | |
| 3,830,314 | 8/1974 | Aitkenhead . | |
| 3,856,331 | 12/1974 | Bogdanovich | 280/479 |
| 4,076,273 | 2/1978 | Campion | 172/439 |
| 4,340,240 | 7/1982 | Anderson . | |
| 4,674,786 | 6/1987 | Lynch | 414/24.5 |
| 4,807,899 | 2/1989 | Belcher | 280/477 |
| 5,064,338 | 11/1991 | Lawrence . | |
| 5,277,448 | 1/1994 | Colibert | 280/491.5 |
| 5,423,394 | 6/1995 | Kendle . | |
| 5,476,279 | 12/1995 | Klemetsen | 280/416.1 |
| 5,690,182 | 11/1997 | Ward . | |
| 5,727,803 | 3/1998 | Johnson | 280/416.2 |
| 5,730,227 | 3/1998 | Hund . | |

*Primary Examiner*—Robert E. Pezzuto
*Assistant Examiner*—Nathan Mammen
*Attorney, Agent, or Firm*—King and Schickli, PLLC

[57] ABSTRACT

An improved three-point hitch assembly is provided with on board storage for towing implements or the like. The hitch assembly includes a frame having an upstanding post carried on a cross bar. A hitch receiver for holding and supporting a hitch bar or tow bar in a towing position is carried on the frame, preferably on the underside of the cross bar. One or more receptacles are carried on the cross bar adjacent to the upstanding post for receiving and holding a towing implement when not in use. An auxiliary receiver is provided on the upstanding post for supporting an auxiliary implement, such as a spear, in an operative position. The cross bar is substantially hollow and includes an tubular insert for receiving and holding the auxiliary implement when not in use. An elevated hitch ball is also provided on the upper portion of the upstanding post to provide the hitch with gooseneck towing capability.

17 Claims, 1 Drawing Sheet

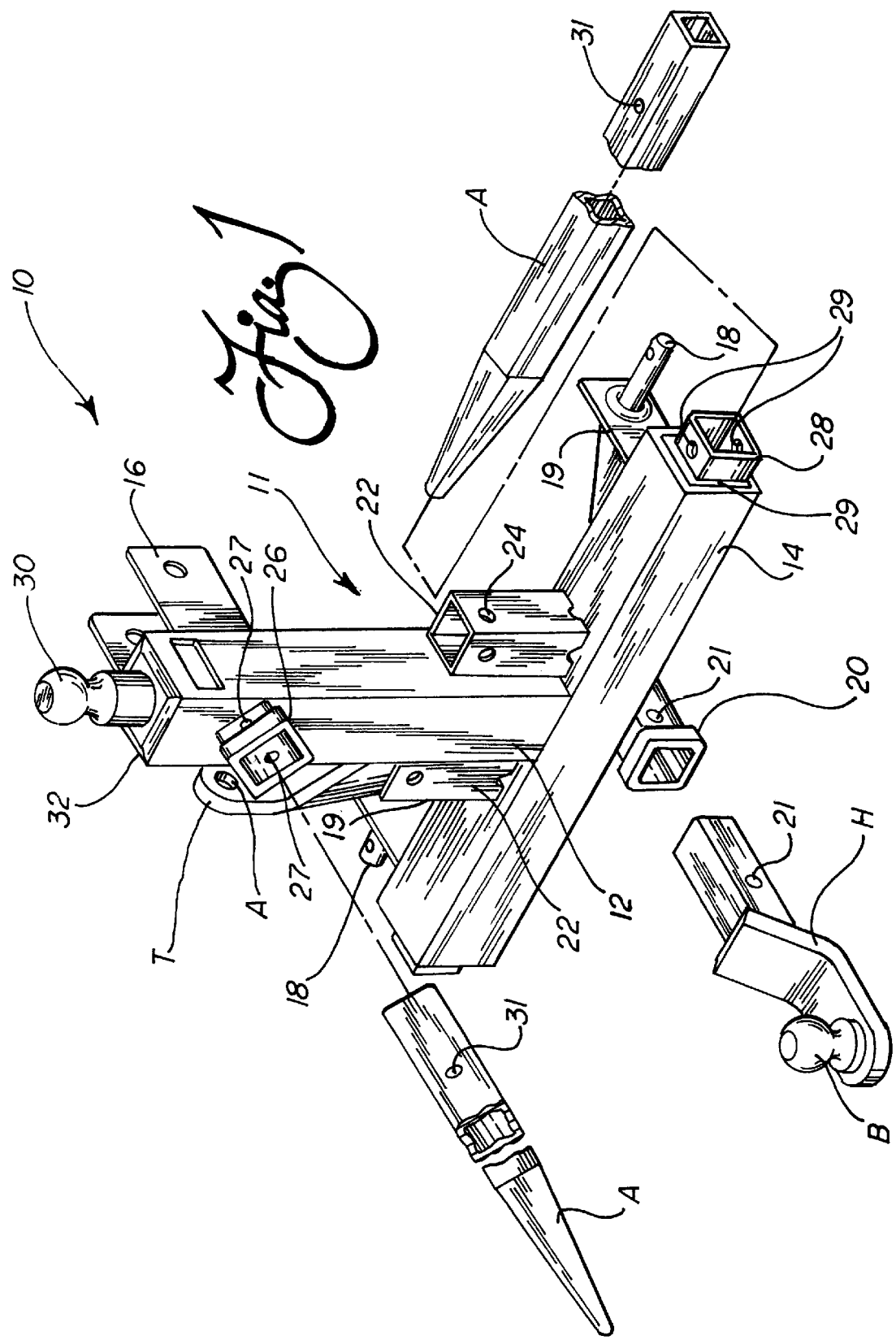

6,125,945

THREE POINT HITCH WITH ON BOARD STORAGE RECEPTACLES

TECHNICAL FIELD

The present invention relates generally to the towing and hitch art and, more particularly, to a three point hitch having on board storage receptacles for holding a tow/hitch bar or the like when not in use.

BACKGROUND OF THE INVENTION

Various types of hitches for towing vehicles behind a tractor are known in the art. One popular type is known as a "three-point" hitch, so named because it connects to the rear of the towing vehicle, which is usually a tractor, at three points. Examples of hitches broadly fitting this description are shown in U.S. Pat. No. 5,730,227 to Hund, U.S. Pat. No. 5,690,182 to Ward, and U.S. Pat. No. 4,340,240 to Anderson, and the numerous references cited therein.

Of course, three point hitches are often used for towing and, thus, commonly include means for towing a trailer or the like behind a tractor. In the '227 Hund patent, the towing means includes a tongue that is integrally formed with the frame of the hitch. However, the more common practice is to provide a universal receiver on the hitch itself for receiving a tow or hitch bar, such as is illustrated in the Ward '182 patent. This design advantageously allows for substitution of the towing implements as may be required for a particular operation.

However, one difficulty with the design proposed in the Ward '182 patent and all others of which we are aware is that no convenient place is provided for receiving, holding, and storing one or more of these various implements when they are not in the towing position. Often, the implements are simply placed on any suitable flat surface on the tractor, which of course allows them to fall off during operation and become misplaced. The alternative is for the tractor operator to carry the tow/hitch bar. However, this interferes with the ability to operate the tractor and also greatly reduces the comfort level of the operator.

In addition to its towing capabilities, the three point hitch also facilitates the carrying of objects behind the tractor and is often provided with means for assisting in completing this task. As set forth in several of the above-listed patents, the carrying means often includes lifting forks or the like that are removably secured to the hitch using vertically-oriented receivers or the like. Although the desired carrying function is provided, it should be appreciated that the individual forks are cumbersome to install and remove. Moreover, like the towing implements, there is generally no convenient place to store these lifting forks or similar auxiliary implements when not in use, thus making them subject to frequent loss.

Therefore, a need is identified for a hitch which both supports and provides storage for towing and other types of implements used for carrying objects. More specifically, the hitch would include on board storage receptacles for receiving and holding towing implements, such as tow or hitch bars. Additionally, the hitch would include means for supporting an auxiliary implement that can be used to carry objects, as well as on board storage for receiving and holding the auxiliary implement when not in use.

SUMMARY OF THE INVENTION

Accordingly, it is a primary object of the present invention to provide a hitch with on board storage receptacles for receiving and holding both towing or auxiliary implements when not in use.

It is another object of the present invention to provide a hitch receiver for receiving a tow or hitch bar in the towing position, said hitch also having one or more receptacles for receiving and holding the tow/hitch bar when not in use.

Still another object of the present invention is to provide a hitch having an auxiliary receiver for receiving and holding an auxiliary implement in position, said hitch also having on board storage for receiving and holding the auxiliary implement when not in use.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a hitch for use on a tractor or the like is provided. In addition to towing and carrying capabilities, the hitch includes on board storage receptacles for receiving and holding towing and/or auxiliary implements when not in use. In the preferred embodiment, the hitch includes a frame and means for securing the frame to the trailer. A hitch receiver carried on the frame receives and supports a towing implement, such as a tow or hitch bar, in position for towing a trailer or the like. When either the tow or hitch bar is not in use, it may be placed in the one or more storage receptacles that are also carried on the frame of the hitch. Advantageously, the receptacle receives and securely holds the tow/hitch bar, thereby ensuring that it is not lost or misplaced during operation of the tractor.

In the preferred embodiment, the frame includes an upstanding post carried on a cross bar to form an inverted T-shape. The connecting means includes a bracket carried on the upper portion of the upstanding post and connector pins carried on the distal ends of the cross bar. The bracket/connector pins correspond to complimentary structures provided at the rear of the tractor to support the hitch. The multiple points of attachment create the "three-point hitch," various examples of which are shown and described in the patents listed above. The complimentary structure on the tractor for connecting with the bracket/connector pins often comprises three levers; two side levers that pivot or swing inwardly to mate with the connector pins and a top lever that is connected to powered or hydraulic lifting means. The top lever allows for the selective adjustment of the vertical position of the hitch during operation.

To minimize the potential for interference with the functionality of the hitch, the receptacles for the tow/hitch bars are ideally carried in an upright position on the cross bar, preferably adjacent to the upstanding post. The storage receptacles are tubular and have an open end for receiving the respective end of the tow/hitch bar. Apertures are formed in the side walls of the receptacles for aligning with corresponding apertures provided in the tow or hitch bar. In the proper position, these aligned apertures register to receive a locking pin which securely holds the tow/hitch bar in the receptacle.

In accordance with another important aspect of the present invention, the upstanding post carries an auxiliary receiver for holding and supporting an auxiliary implement. In the preferred embodiment, the auxiliary receiver is formed through a wall of the upstanding post and the implement is a spear for carrying bales of hay or the like.

Apertures formed in the side walls of the receiver register with apertures formed in the spear to receive a locking pin for holding the implement in place. In operation, the spear is inserted into a bale of hay or similar object. The hydraulic power of the tractor is utilized to raise the lever, which in turn raises the hitch in a vertical direction. This, in turn lifts the hay bale, which of course facilitates carrying and transporting it to another location using the tractor. To release the hay bale, the hitch is simply lowered and the tractor driven forward such that the spear is pulled from the bale.

To provide a convenient place for storing the spear when not in use, the cross bar portion of the frame is tubular. The spear is telescoped into the substantially hollow inner portion of this tubular cross bar. Apertures in the side walls of the tubular cross bar receive a locking pin to hold the spear securely in place. A tubular, sleeve-like insert may also be provided for insertion in the cross bar to accommodate spears or other auxiliary implements of different cross-sectional dimensions. Similar to the upstanding receptacles, the cross bar (or alternatively the tubular insert, if present) is provided with apertures that align with the similar mounting apertures formed in the spear. The aligned apertures register to receive a locking pin for holding the spear securely in place in the cross bar during operation of the tractor.

In addition to the tow or hitch bar, a hitch ball is provided on the upper portion of the upstanding post. Advantageously, this elevated hitch ball provides gooseneck towing capability and, thus, permits use of the hitch of the present invention with either a standard trailer or a trailer having a gooseneck arrangement. In the preferred embodiment, the hitch ball is secured directly to a top plate which covers the upstanding post.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and, together with the description, serve to explain the principles of the invention. In the drawing:

FIG. 1 is a perspective view of the three point hitch of the present invention, illustrating in particular the receptacles for receiving and holding the tow/hitch bar when not in the towing position, the receiver for the auxiliary implement formed in the upstanding post portion of the hitch, and the tubular cross bar for receiving and holding the auxiliary implement when not in use.

Reference will now be made in detail to the present preferred embodiment of the invention, an example of which is illustrated in the accompanying drawing.

DETAILED DESCRIPTION OF THE INVENTION

Reference is now made to FIG. 1, illustrating a preferred embodiment of the hitch 10 of the present invention. The hitch 10 includes a frame 11 having an upstanding post 12 carried on a cross bar 14, thus forming an inverted T-shape. A bracket 16 on the upper portion of the post 12 provides a first point of attachment for the hitch 10. As illustrated, each wing of the bracket 16 includes an aperture for receiving a pin or similar complimentary connecting means to connect the hitch to a powered lifter lever extending from the rear of the tractor (not shown).

The remaining two connections to complete the three points of attachment are provided by connector, or hitch, pins 18 located at the distal ends of the cross bar 14. These pins 18 are preferably carried on projecting brackets 19 attached to the rear of the cross bar 14 to avoid creating interference with access to the receptacle 26 for the auxiliary implement A, as will be further understood after reviewing the description which follows. The distal end of each pin 18 includes an aperture for receiving a locking pin, spring cotter, or similar structure (not shown). This locking arrangement ensures that the complimentary connector at the rear of the tractor (which is usually an apertured mounting head formed at the end of an individual, swinging lever arm (not shown)), is securely trapped and held on the pin 18.

To provide the desired towing capability, the cross bar 14 carries a hitch receiver 20 for receiving and supporting a tow bar T, hitch bar H, or the like in a towing position. In the preferred embodiment, the hitch receiver 20 is mounted adjacent to the underside of the cross bar 14. This mounting position provides easy access for the insertion or removal of the respective towing implement and also avoids creating any interference with the use of the storage receptacles, as will be further understood after reviewing the description which follows. To secure the tow/hitch bar T/H in the hitch receiver 20, aligned, apertures 21 are formed in the sides of the tow/hitch bar T/H and the receiver 20, respectively. A locking pin of a type known in the art (not shown) is provided for insertion through the apertures upon alignment and registration. As illustrated, the hitch bar H includes a hitch ball B for receiving the coupler socket of the trailer. Of course, the tow bar T is similar in structure, but includes a towing aperture A (instead of the hitch ball B) that is aligned with a corresponding aperture formed in the tongue of a wagon or similar vehicle (not shown).

To provide the desired temporary storage for the tow/hitch bar T/H, one or more upstanding receptacles 22 are carried on the cross bar 14. In the preferred embodiment, the receptacles 22 are positioned adjacent to each side of the upstanding post 12. This positioning minimizes interference with the operation of the hitch 10. The receptacles 22 are tubular and, thus, receive the tubular end of the tow/hitch bars T/H. Although gravity is sufficient to hold the tow/hitch bars T/H in place during conventional operation, complimentary apertures 24 are provided in the receptacles 22 which align with the corresponding apertures of the tow/hitch bar T/H. The same locking pin (not shown) used to secure the tow/hitch bar T/H in the hitch receiver 20 is then inserted through the apertures 24 to hold the tow/hitch bar T/H securely in the receptacle 22.

An important aspect of the invention is the provision of an auxiliary receiver 26 for receiving and supporting an auxiliary towing implement A for use in lifting and carrying objects. In the preferred embodiment, the auxiliary receiver 26 extends through one wall of the upstanding post 12, which as noted above is preferably of tubular construction. An auxiliary implement A, shown for purposes of illustration as a spear for insertion in hay bales or the like, is inserted in the receiver 26 for use in lifting and carrying objects. To securely hold the spear A in position, apertures 27 are provided in all sides of the receiver 26 that align and register with corresponding apertures at or near the end of the spear. Once registered, the apertures receive a locking pin (not shown) for securing the spear A in position in the receiver 26. The spear A is preferably of an elongate, tubular construction, having a first end that is adapted for insertion in the tubular receiver 26 and a second end that terminates in a blunt point. To provide the greatest resistance to bending forces created during carrying heavy objects, the receiver 26 is ideally mounted such that the top corner (i.e. the edge formed where the side walls meet) faces upwardly.

In operation, the spear A is installed on the receiver 26 and the pointed end is driven into a hay bale or similar object. The hitch 10 is then lifted using the powered lever of the tractor, which raises the speared object off of the ground. To withdraw the spear, the hitch 10 is simply lowered to rest the load on the ground and the tractor driven forward.

When not in use, the auxiliary implement A is stored in the hollow portion of the tubular cross bar 14. In the preferred embodiment, a tubular insert 28 is secured in the cross bar 14 using a face plate 29. The insert 28 is particularly adapted for receiving and securely holding the auxiliary implement A. As is the case with the receptacles 22, the tubular insert 28 includes apertures 29 formed in one or more side walls that align and register with apertures 31 formed in the auxiliary implement A. The insertion of a locking pin through these apertures serves to hold the spear A securely in the cross bar 14 when it is not in use. Although a tubular insert is shown in use, it should be appreciated that the cross bar 14 can provide the holding and securing function for the auxiliary implement without the need for an insert 28 or similar structure. Thus, apertures (not shown) may be formed in any of the side walls of the cross bar 14 for registering with the complimentary apertures on the auxiliary implement A.

To provide dual towing capability, an elevated, gooseneck receiving hitch ball 30 is carried on the top plate 32 that covers the open top of the upstanding post 12. In this position, the hitch ball 30 is well-suited for receiving the coupler socket of a gooseneck type trailer. The vertical position of the hitch ball 30 is adjustable through the action of the powered or hydraulic lifters on the tractor.

All components of the hitch 10 are preferably made of steel. Ideally, the tubular upstanding post 12 and cross bar 14 forming the frame 11 are fabricated from a tube of, for example, three inch square steel material. Any joining is completed using fillet welds or similar metal joining techniques that result in a strong, rigid, and lasting bond. Of course, the use of other types of materials and dimensions are possible depending on the particular tractor or towing operation.

In summary, an improved three-point hitch assembly 10 is provided with on board storage for towing implements T/H or auxiliary implements A. The hitch assembly 10 includes a frame 11 having an upstanding post 12 carried on a cross bar 14. A hitch receiver 20 for supporting a tow/hitch bar T/H in an operative position is carried on the frame 10, and preferably on the underside of the cross bar 14. One or more receptacles 22 are also carried on the cross bar 14 adjacent to the upstanding post 12 for receiving and holding the tow/hitch bars T/H when not in use. An auxiliary receiver 26 is provided on the upstanding post 12 for supporting an auxiliary implement A, such as a spear for carrying bales of hay or the like, in an operative position. The cross bar 14 is substantially hollow and includes an tubular insert 28 for receiving and holding the auxiliary implement A when it is not in use. A hitch ball 30 is also secured to the upstanding post 12 to provide gooseneck towing capability. Advantageously, the hitch 10 of the present invention provides multi-functional towing, carrying, and lifting capabilities, while also providing a convenient place to store the various implements, such as tow/hitch bars and spears, when not in use, thereby ensuring against loss and increasing overall efficiency.

The foregoing description of a preferred embodiment of the three point hitch of the present invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A multi-functional hitch assembly for use on a vehicle, comprising:
    a frame including an upstanding post carried on a cross bar, wherein said frame forms an inverted T-shape;
    a connector for connecting said frame to the vehicle;
    a hitch receiver carried on said frame for supporting a tow/hitch bar in an operative position;
    at least one receptacle on said frame for receiving and holding said tow/hitch bar when not in use; and
    an auxiliary receiver carried on said frame for supporting an auxiliary implement.

2. The hitch assembly according to claim 1, wherein said connector includes a connecting pin carried adjacent to each end of said cross bar and a bracket adjacent a top portion of said upstanding post, whereby said connecting pins and said bracket secure said frame to the vehicle at three points.

3. The hitch assembly according to claim 1, wherein said at least one receptacle is carried in an upright position on said cross bar adjacent to said upstanding post.

4. The hitch assembly according to claim 1, wherein said cross bar is substantially hollow for receiving and holding said auxiliary implement when not in use.

5. The hitch assembly according to claim 1, wherein said cross bar is substantially hollow and further includes a tubular insert which receives and holds said auxiliary implement when not in use.

6. The hitch assembly according to claim 1, further including a hitch ball carried on said upstanding post for providing gooseneck towing capability.

7. A multi-functional hitch assembly, comprising:
    a frame including an upstanding post and a cross bar;
    a hitch receiver carried on said frame for receiving and holding a tow/hitch bar;
    at least one storage receptacle carried on said frame for receiving and holding said tow/hitch bar when not in use;
    an auxiliary receiver for supporting an auxiliary implement in an operative position;
    said cross bar being substantially hollow for receiving and holding said auxiliary implement when not in use.

8. The hitch assembly according to claim 7, further including a bracket carried on said upstanding post and a connecting pin carried at each end of said cross bar, whereby said bracket and said connecting pins attach said frame to the tractor at three points.

9. The hitch assembly according to claim 7, further including a tubular insert secured in said substantially hollow cross bar for receiving and assisting in holding said auxiliary implement when not in use.

10. The hitch assembly according to claim 9, wherein said insert projects outwardly from said cross bar and includes a first aperture that corresponds with a second aperture formed in said auxiliary implement, said corresponding apertures aligning to receive a pin for releasably securing said auxiliary implement in said insert.

11. The hitch assembly according to claim 7, wherein said at least one storage receptacle is provided with a first aperture corresponding to a second aperture formed in said tow/hitch bar, said corresponding apertures aligning to receive a pin for releasably securing said tow/hitch bar in said at least one storage receptacle.

12. The hitch assembly according to claim 7, further including a hitch ball carried on said upstanding post for providing gooseneck towing capability.

13. A multi-functional hitch assembly for use on a vehicle, comprising:

a frame including an upstanding post carried on a cross bar;

a connector for connecting said frame to the vehicle;

a hitch receiver carried on said frame for supporting a tow/hitch bar in the operative position;

at least one upstanding receptacle carried on said cross bar for receiving and holding said tow/hitch bar when not in use; and an auxiliary receiver for supporting an auxiliary implement.

14. The hitch assembly according to claim 13, wherein said connector includes a connecting pin carried adjacent to each end of said cross bar and a bracket adjacent a top portion of said upstanding post, whereby said connecting pins and said bracket secure said frame to the vehicle at three points.

15. The hitch assembly according to claim 13, wherein said at least one receptacle is carried in an upright position on said cross bar adjacent to said upstanding post.

16. The hitch assembly according to claim 13, wherein said cross bar is substantially hollow for receiving and holding said auxiliary implement when not in use.

17. The hitch assembly according to claim 13, further including a hitch ball carried on said upstanding post for providing gooseneck towing capability.

* * * * *